Sept. 1, 1931.   C. W. MABEY   1,821,226
AUTOMATIC DISCHARGING TOASTER
Filed March 7, 1928   5 Sheets-Sheet 2

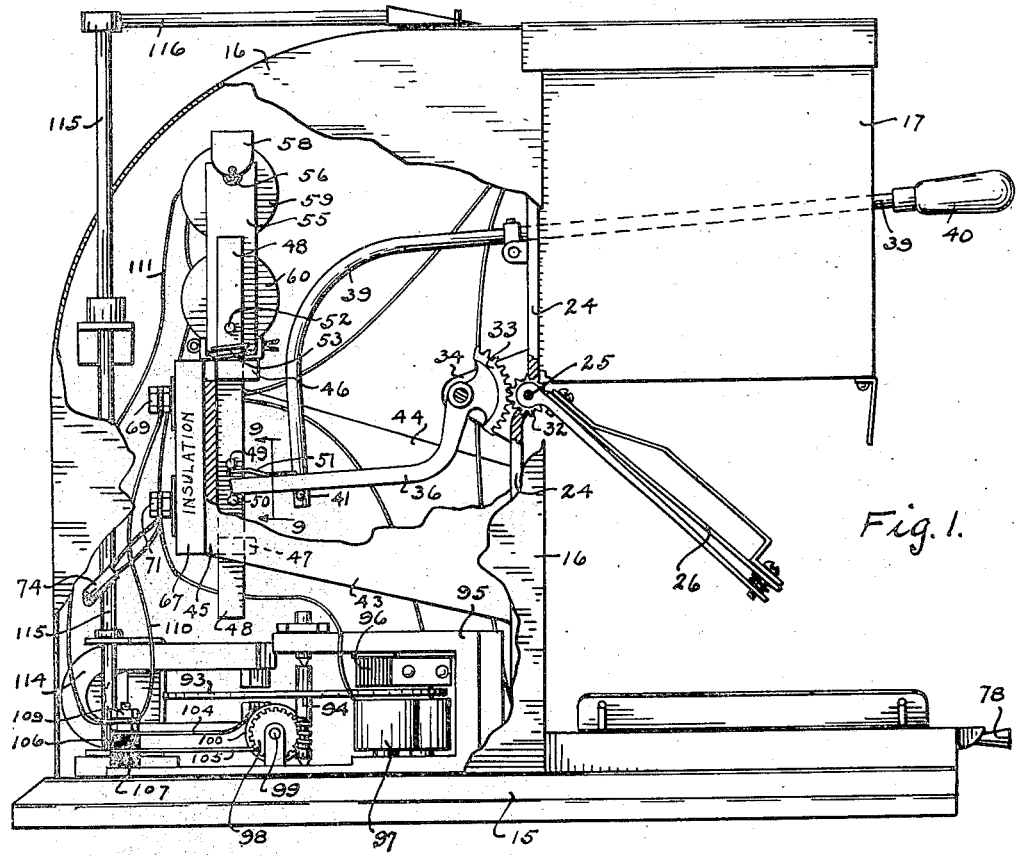

INVENTOR,
Charles W. Mabey,
By Minturn & Minturn,
Attorneys.

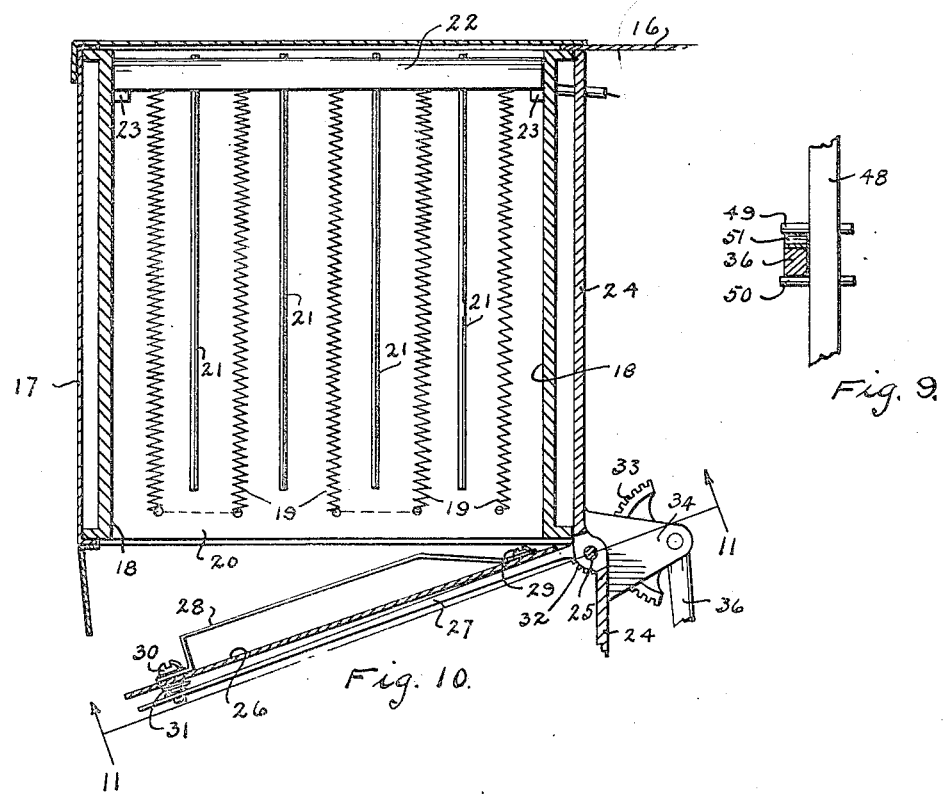
Fig. 9.
Fig. 10.
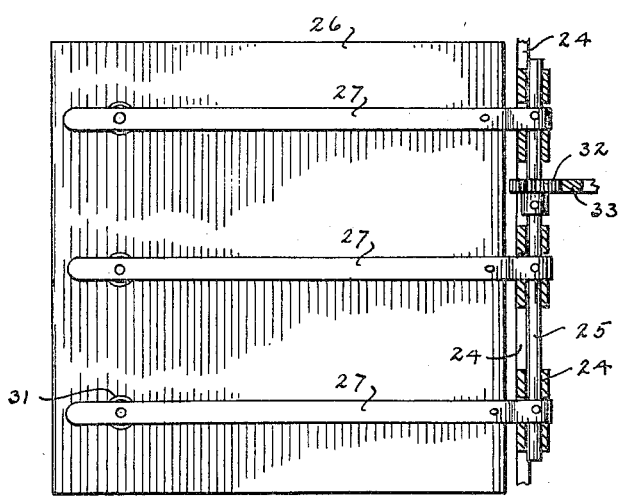
Fig. 11.

Sept. 1, 1931.    C. W. MABEY    1,821,226

AUTOMATIC DISCHARGING TOASTER

Filed March 7, 1928    5 Sheets-Sheet 5

INVENTOR,
Charles W. Mabey,
By Minturn & Minturn,
Attorneys.

Patented Sept. 1, 1931

1,821,226

UNITED STATES PATENT OFFICE

CHARLES W. MABEY, OF INDIANAPOLIS, INDIANA, ASSIGNOR TO MABEY ELECTRIC MANUFACTURING COMPANY, OF INDIANAPOLIS, INDIANA

AUTOMATIC DISCHARGING TOASTER

Application filed March 7, 1928. Serial No. 259,680.

This invention relates to means for toasting food, such as bread and the like and has for its principal object the automatic discharge of the toasted object from the toasting means following a predetermined period of toasting.

The toaster is supplied with electrical heating elements between which the food is toasted for the desired length of time, following which the food is removed entirely away and to be at a substantial distance from the heating elements which, although not supplied with electricity after the predetermined toasting period has elasped, remain sufficiently warm to over-toast, or even burn the food should it be permitted to remain in the toasting position or in near proximity to the elements.

Other objects will become apparent in the following description of the invention in reference to the accompanying drawings, in which—

Figures 3, 4, 5, 6, 7:
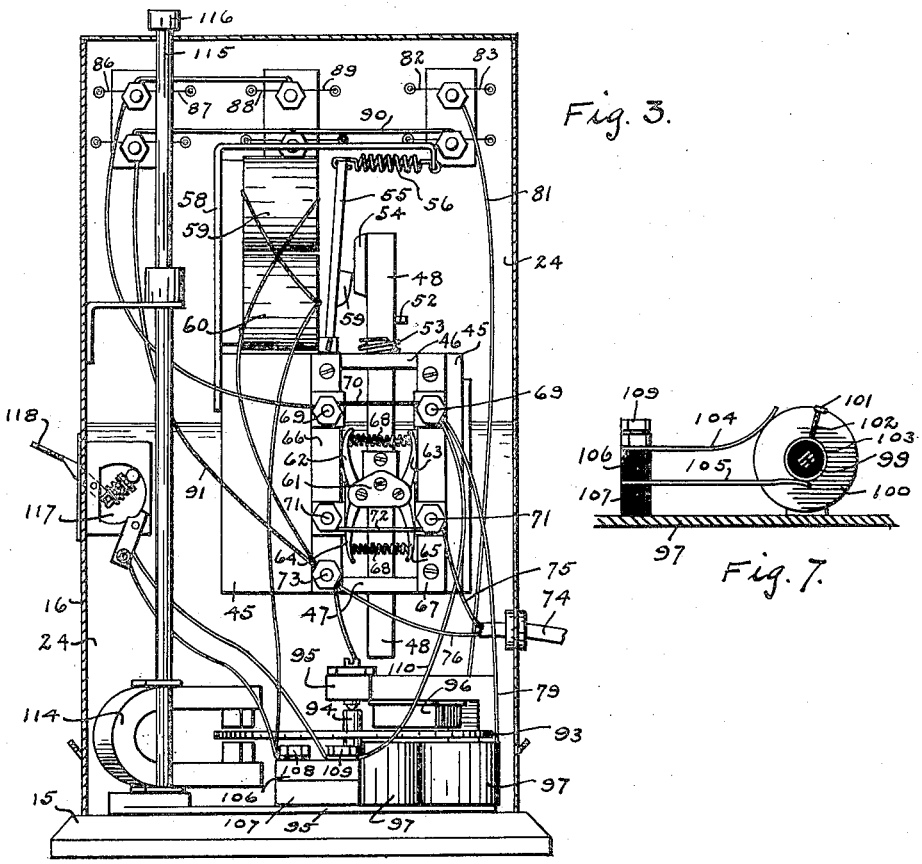
Figure 8:
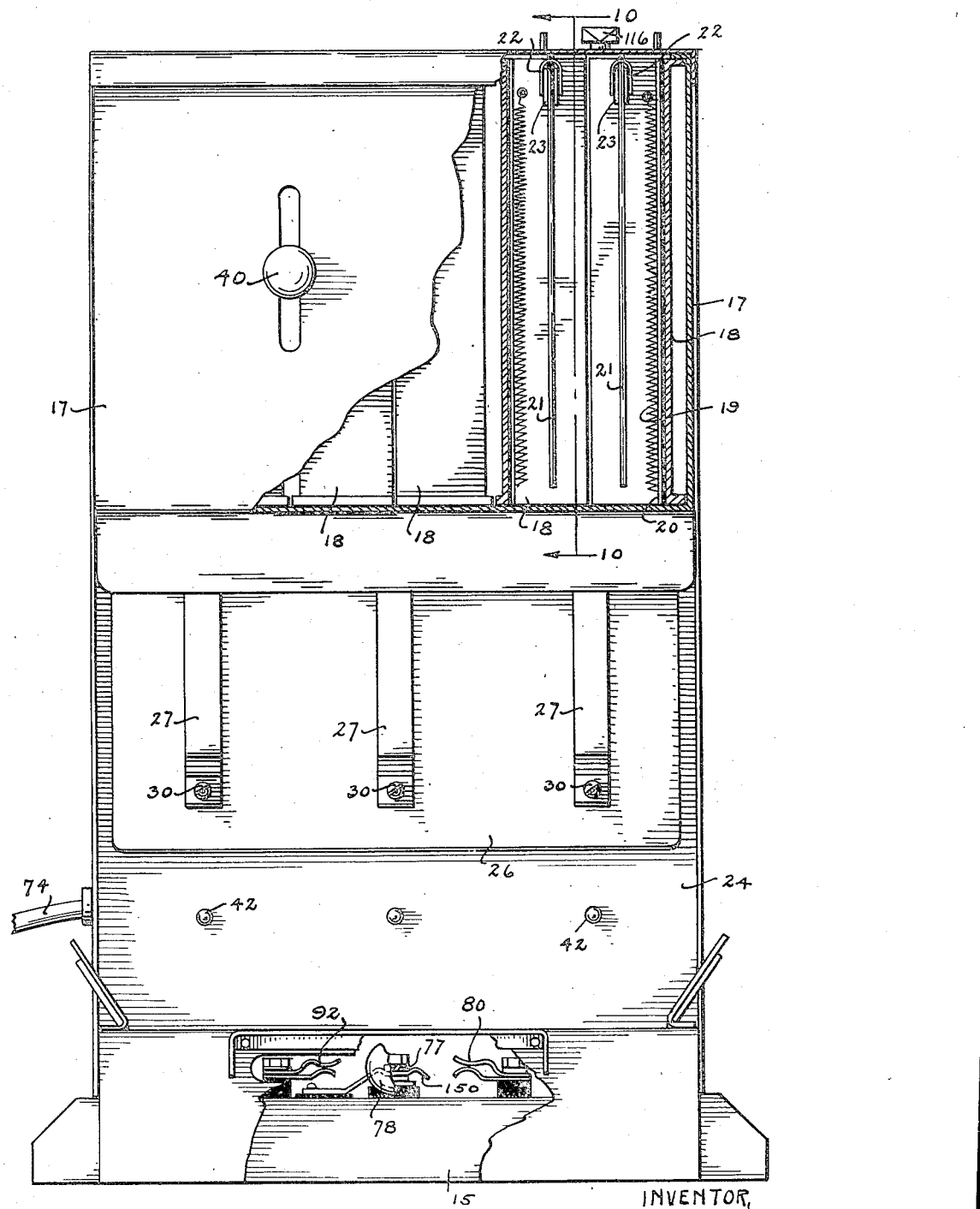
Figure 12:
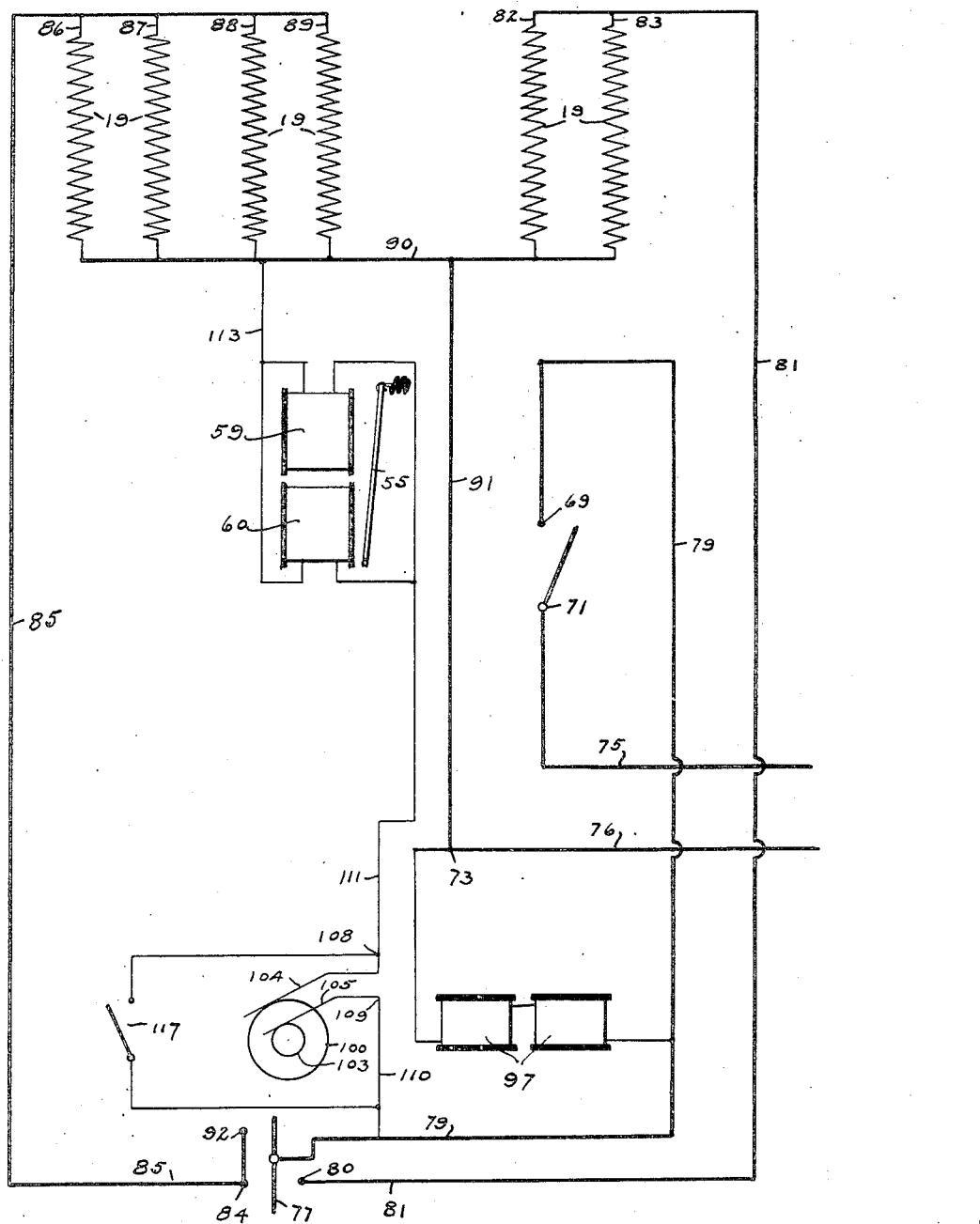

Fig. 1 is a fragmentary side elevation of the automatic toaster;

Fig. 2, a fragmentary top plan view of the toaster;

Fig. 3, a rear elevation of the toaster with the cover removed;

Fig. 4, a fragmentary top plan view of the forward base end of the toaster showing the element control switch;

Fig. 5, a fragmentary side elevation of the base;

Fig. 6, a detail in top plan view of the rotary switch;

Fig. 7, a vertical section through the rotary switch on the line 7—7 in Fig. 6;

Fig. 8, a fragmentary front elevation of the toaster on an enlarged scale;

Fig. 9, a vertical section on the line 9—9 in Fig. 1;

Fig. 10, a vertical section through a toasting chamber on the line 10—10 in Fig. 8;

Fig. 11, a section on the line 11—11 in Fig. 10, showing in detail the toast chamber door; and Fig. 12, a wiring diagram of the toaster.

Like characters of reference indicate like parts throughout the several views in the drawings.

The toaster comprises in general a base 15, a housing 16 extending upwardly from the rear portion of the base, and a box 17 containing chambers to receive the food supported from the housing 16 to hang above and over the forward end of the base 15 to have an appreciable space therebetween.

The box 17 carries a plurality of castings 18 substantially U-shaped in horizontal cross-section (Figs. 2, 8, and 10) which are arranged in pairs to define chambers or passageways therebetween through the box open at both the top and bottom, three such chambers being here shown. Against the opposite fore and aft side walls in each chamber are positioned electrical heating elements comprised of resistances 19 carried on insulating backs 20.

A grid is formed by rigidly suspending a plurality of wires 21, four in number here shown, from an inverted U-shaped channel member 22, and lugs 23 project from the castings 18 so that a channel member 22 may be slipped down over the lugs in each casting to have the wires 21 hang vertically in a fixed position in front of each heating element, whereby a piece of bread (not shown) may be dropped down from above between two channel members 22 to be supported vertically by the wires 21 so that the bread cannot come into contact with the resistances 19. The grids may be removed for cleaning by pulling the channel members 22 up off the lugs 23.

The forward wall 24 of the housing 16 extends upwardly to form the rear wall of the box 17. A shaft 25 is rotatably carried by the wall 24 near the under side of the box 17 and a door 26 is mounted to rotate with the shaft 25 by being carried on the three hinge bars 27 which are engaged and pinned on the shaft 25 by their inner ends. These bars 27 extend forwardly under the door 26 to near the front edge, and immediately over each bar 27 on the top side of the door 26 is a spacing member 28. A screw 29 is passed through the rear end of each of the spacing members 28, the door 26 and screw threadedly engages in the bar 27 thereunder. Similarly a screw 30 is passed through the forward end of each spacing member 28, the door 26, and screw-threadedly entered into the bar 27 below, but a spring 31 is interposed around the screw 30 between the door 26 and the bar 27. The door 26 is adapted to be swung from a vertically depended position against the forward wall 24 to a horizontal position against the under sides of the castings 18 to form a tight closure therewith to prevent currents of air entering and passing upwardly over the heating elements. The shaft 25 is rotated to swing the bars 27 to carry the door 26 therewith and the door 26 contacts the castings 18 slightly before the bars 27 stop their upward swing so that the bars 27 compress the springs 31 slightly in pressing the door 26 snugly against the castings 18.

A spur gear 32 is secured on the shaft 25 and a gear segment 33 meshes with the gear 32 from behind the wall 24, being pivotally supported therefrom between the ears 34. A lever arm 36 projects downwardly and backwardly from the segment 33. By raising the arm 36, the gear 32 is correspondingly revolved to raise the door 26, and the door is accordingly dropped open by lowering the arm 36. It will be noted that when the door 26 is in this upper closed position (the door being shown in a partly raised position throughout the drawings) the spacing members 28 enter respectively into the spaces between the heating elements. These spacing members serve as rests to support bread or the like which is being toasted, so that the bread is not in contact with the door 26 but spaced slightly thereabove to receive proper radiation of the heat from the elements.

A cover plate 37 is removably fitted over the top of the box 17 and is provided with the longitudinal slots 38, each of a width substantially equal to the distance between the two grids in each chamber between the pairs of castings 18.

To raise the arm 36 so as to close the door 26, a lever 39 is hingedly supported on the wall 24 to have its forward end passed between the backs of two adjacent pairs of castings to pass outwardly through a slot in the front wall of the box 17 to carry an operating handle 40. The rear end of the lever 39 extends backwardly and downwardly to carry a horizontally disposed cross pin 41 below the arm 36 so that when the handle 40 is pushed downwardly the pin 41 is carried upwardly against the under side of the arm 36 to then carry this arm 36 upwardly therealong. Due to the weight of the door 26, the arm 36 and the rear end of the lever 39, the door 26 normally tends to drop downwardly by gravity to its open, vertically hanging position against the front of the wall 24. Rubber bumpers 42 are provided to silence the striking of the door 26 against the wall (Fig. 8.)

A bracket is projected rearwardly from the wall 24 within the housing 16 (Figs. 1, 2 and 3) and is formed by the two supporting legs 43 and 44 with the vertically disposed plate 45 there-between at the rear ends. On the forward face of the plate 45 are the top and bottom guides 46 and 47 through which is slidingly carried the latch post 48. From the side of the post 48 between the guides 46 and 47 project the two pins 49 and 50 which are spaced apart vertically a distance slightly greater than the height of the end of the arm 36. The arm 36 is of such length that it may enter between the pins 49 and 50 as a means of raising the post 48. A spring 51 is carried on the top face of the arm 36 to contact against the under side of the top pin 49 so that the arm 36 may travel upwardly slightly should the latch post 48 be held against movement.

The upper end of the latch post 48 carries a stop pin 52 above the top guide 46 and a spring 53 is carried about the post 48 to be contacted by the pin 52 as a cushion should the post 48 be allowed to drop. A lug 54 projects from the opposite face of the post 48 and an iron bar 55 is hinged from its bottom at the top of the plate 45 to be pulled normally toward the post 48 by the spring 56 which extends tensionally between the upper end of the bar 55 and the outer end of the upper horizontal leg of the L-shaped bracket 58 which is supported by the plate 45. The bar 55 carries a shoulder 59 which is adapted to move under the lug 54 when the post 48 is sufficiently raised. It will be seen, then, that by pushing downwardly on the handle 40, the arm 36 is lifted to bring the door 26 to its closed position at the same time the latch post 48 has been elevated to permit the shoulder 59 to swing under the lug 54 whereby the door 26 is effectively held against dropping since the post 48 can not drop until the bar 55 is pulled back to overcome the spring 56, the end of the arm 36 being engaged between the pins 49 and 50 on the post.

Carried on the vertical leg of the bracket 58 is an electro-magnet having the two coils 59 and 60, so mounted that when energized, the bar 55 will be pulled toward the coils to over-come the pull of the spring 56 so as to carry the shoulder 59 out from under the lug 54 to permit the post 48 to drop, thereby allowing the door 26 to drop also.

On the rear face of the post 48 is attached a body 61 insulated from the post, which carries the four fingers 62, 63, 64, and 65 pivoted thereto. A pair of insulating blocks 66 and 67 are secured to the plate 45 in spaced apart, parallel vertical positions to have the fingers pass therebetween. A spring 68 is placed between the top and bottom pairs of the fingers so as to cause the fingers to press against the faces of the blocks 66 and 67. Metal contacts extending from the terminal posts 69 are fixed near the top ends of the blocks 66 and 67, on each of the inner opposing faces to be contacted by the upper fingers 62 and 63 only when the post 48 is sufficiently elevated. The two posts 69 are tied together by the wire 70. Similarly metal contacts extend from the two lower posts 71 to rest on the lower ends of the inner opposing faces of the blocks 66 and 67, and the posts 71 are electrically tied together by the wire 72. When the post 48 is moved, the fingers 62, 63, 64 and 65 are correspondingly moved between the contacts from the posts 69 and 71, to make and break contact therebetween as a single pole switch. A third terminal 73 is carried on the block 66.

A cable 74 coming from without the housing 16 carries two conductor wires, the one wire 75 being attached to the bottom set of terminals 71 and the other wire 76 going to the terminal 73.

A switch is provided in the forward end of the base 15 (Figs. 4, 5 and 8) comprising a blade 77 pivotally mounted to be operated by a handle 78 on the forward end outside of the base. The blade 77 is connected with the posts 69 by the wire 79. A spring contact 80 has a wire 81 leading therefrom to the terminal ends 82 and 83 of two opposing resistances 19 in one chamber of the box 17 (Figs. 3, and 12).

A second contact 84 has a wire 85 leading therefrom to the terminal ends 86, 87, 88, and 89 of the resistances 19 in the other two chambers in the box 17. The opposite terminals of all of the resistances 19 in all of the three chambers are tied together by the wire 90 from which leads the wire 91 to the terminal 73. By this arranged circuit, assuming the fingers 62, 63, 64 and 65 to be interconnecting the contacts of the posts 69 and 71, the switch blade 77 may be put in the central "off" position where, it is yieldingly retained by the spring 150 and no current will flow from the supply wires 75 and 76 to any of the resistances 19. By moving the blade 77 to the "low" position, the blade 77 engages the contact 84 whereby a circuit is closed to permit current to flow through all of the resistances 19 in two chambers only of the box 17.

Then by shifting the blade 77 from the "low" position through the "off" to the "high" position, the forward end of this blade 77 is engaged by the contact 80 while the rear end of the blade 77 is engaged in the contact 92 which is electrically tied to the contact 84, in which "high" position, the blade 77 closes circuits including all resistances 19 in all three chambers of the box 17.

It is obvious that the length of time current flows through the resistances 19 and the length of time the door 26 remains closed to hold bread adjacent the resistances 19, each has a determining effect upon the degree of toasting of the bread, and the means of varying the time period of the functioning of these two factors will now be described.

Mounted on the base 15 within the housing 16 is a disc 93 which is secured on a vertically positioned axial shaft 94 so that the disc is free to be revolved in a horizontal plane. The shaft 94 is pivotally retained between a U-shaped casting 95 and this casting 95 carries a laminated iron block 96 above the disc near its outer edge and a pair of electro-magnet coils 97 immediately under the block 96 below the disc 93 with the axes of the coils 97 normal to the plane of the disc 93.

These two coils 97 are in series one with the other and between the terminals 69 and the terminal 73 so that when the fingers 62, 63, 64, and 65 are raised by the post 48 to close the circuit between the terminals 69 and 71 and current is flowing to the resistances 19, current is also thereby supplied to the coils 97, and when the current is so supplied, the disc 93 is set in rotation accordingly. It will be obvious that an alternating current is employed with the above timing mechanism. The lower portion of the shaft 94 is formed as a worm to be meshed by a worm gear 98 which is carried on the horizontally disposed shaft 99 whereby the rotation of the shaft 94 causes a rotation of the shaft 99.

Fixed on the shaft 99 is a fiber wheel 100 which has a narrow metal bar 101 extending transversely across its peripheral face. This bar 101 has an electrical conductor 102 extending therefrom to a metal thimble 103 mounted concentrically on the shaft 99 but insulated therefrom. A brush 104 bearing against the peripheral face of the wheel 100 and a brush 105 bearing against the thimble 103 are supported by the insulating blocks 106 and 107 to have the terminals 108 and 109 from the respective brushes mounted thereon.

A wire 110 leads from the terminal 109 to the terminal 69 and a wire 111 leads from the other terminal 108 to the coils 59 and 60 of the tripping electro-magnet. A wire 113 leads back from the coils 59 and 60 through the wire 90 to the terminal 73, the coils being here shown as in parallel-series connection between the wires 111 and 113. The wheel 100, thimble 103, and brushes 104 and 105 form a rotary switch permitting a circuit to be closed through the coils 59 and 60 but this circuit is closed only after the disc 93 has revolved sufficiently to turn the wheel 100 around to bring the bar 101 into contact with the brush 104. The instant this contact is made, the current then flowing to the coils, 59 and 60 produces a sufficient magnetic field to pull the bar 55 toward the coils to release the post 48 and let it drop to break the circuit between the terminals 69 and 71, which stops the flow of current throughout all parts of the toaster, including all resistances 19, coils 97 and 59 and 60.

While the disc 93 revolves at a low rate, it has sufficient momentum to carry the wheel 100 on, after the current is cut off from the coils 97 so that the bar 101 has just been carried on out of contact with the brush 104 and there stopped and the wheel 100 must make a complete revolution again before the bar 101 may contact the brush 104. The rate of rotation of the disc 93 and the reduction between the worm on the shaft 94 and the worm gear 98 is such that a time element is introduced whereby the time of one revolution of the wheel 100 is the length of time required to give the desired toasting of the bread or other food exposed to the resistances 19.

It is desirable that some means be present for varying that period of time, since some people prefer more toasting than others, and the machine itself, particularly the box 17 becomes warm after a number of continuous toasting operations have been carried out, with the result that after the box 17 is warmed up the toasting period is materially reduced from that required for the first few operations.

I vary the speed of the disc 93 by mounting a horseshoe type magnet 114 on the vertical shaft 115 so that by turning the shaft 115 the poles of the magnet may be swung to have the disc therebetween (Figs. 1 and 2). An adjusting arm 116 is mounted on the top end of the shaft 115 as a means of moving the shaft. By moving the arm to the "slow" position, the poles of the magnet 114 are brought toward the center of the disc, which action slows up the rate of rotation of the disc, thereby causing the resistances 19 to receive current for a longer period than when the arm 116 is moved to other positions to carry the magnet poles outwardly toward the periphery of the disc 93.

Should it be desired to discharge the bread from the box 17 at any time before the tripping magnet coils 59 and 60 have functioned, a toggle switch 117 is provided conveniently on the side of the housing 16, so that by pressing down on the switch lever 118, a circuit is closed across the brush terminals 108, 109 whereby the coils 59 and 60 may be at once energized to stop the flow of all current and permit the door 26 to let the bread drop out. The switch 117 has a spring (not shown) which normally retains the lever 118 and contact making element in the position as shown in Fig. 3, the switch being of well known construction to those versed in the art, the details of which do not enter into my invention.

From the foregoing detailed description, the operation of the toaster is seen to comprise the following steps. The normal position of the lever handle 40 is up and the door 26 hangs vertically downwardly. The arm 116 is set for the desired degree of toasting.

The handle 40 is pushed down, the door 26 comes shut, and current at once begins to flow in the resistances 19. A slice of bread is dropped into each of the chambers being heated as determined by the position of the switch handle 78. As soon as the bread has been toasted the predetermined time, the bar 55 releases the post 48 to open the electrical circuit to all parts, and to drop the door 26, whereupon the bread falls onto the base 15 ready for use.

References in the foregoing description has been made to bread being toasted, but the toaster is equally well adapted to toasting or broiling other foods, such as steaks and the like.

I claim:

1. In a toaster, a toasting oven having a passage narrower in one dimension than the other extending vertically therein open at the bottom, an electrical heating element on each side of the passage, a door hinged at the narrow end of the passage adapted to close the lower end of the passage normally remaining in a position to leave the passage open, an electric timing motor set in operation by the closing of the said door, and electro-magnet means for releasing the door set in operation following a predetermined period of running of the said motor.

2. In a toaster, a toasting oven having a passage narrower in one dimension than the other extending vertically therein open at the bottom, an electrical heating element on each side of the passage, a door hinged at the narrow end of the passage adapted to close the lower end of the passage normally remaining in a position to leave the passage open, means carried by the door to support the toast out of contact with the door, and an electric timing motor set in operation by the closing of the said door, electro-magnet means for releasing the door set in operation following a predetermined period of running of the said motor, and means for varying said period.

3. In a toaster, a toasting oven having a passage extended vertically therein open at its lower end, an electrical heating element within the passage, a door adapted to close the lower end of the passage normally dropping open, a spur gear connected with the door, a trip mechanism associated with said spur gear comprising a lever arm having a gear segment, an electrical switch cooperating with said trip mechanism, the closing of said door both closing said switch to supply electrical current to said element and setting said trip mechanism to retain said door in a closed position, and electrical timing means set in operation by the closing of said switch, said trip mechanism being actuated by said timing means to release said door from said passage.

4. In a toaster an oven and a door hinged to the oven in association with an opening from the under side of said oven, said door comprising a floor, a plurality of hinge bars rigidly secured to the door near the hinge end and extending out along under the door, and springs retained between the outer ends of the bars and the door floor whereby said door may close said opening upon swinging of the bars and further movement of the bars will compress said springs to apply increased pressure against the end of said door at points removed from said hinge end.

5. In a toaster door comprising a floor, a plurality of hinge bars rigidly secured to the door near the hinge end and extending out along under the door, and springs retained between the outer ends of the bars and the door floor, a shaft secured in the hinge ends of the hinge bars, lever means for rocking the shaft and a releasable catch associated with said lever means.

6. In a toaster door comprising a floor, a plurality of hinge bars rigidly secured to the door near the hinge end and extending out along under the door, bread supporting bars attached to and above the floor and springs retained between the outer ends of the bars and the door floor, a shaft secured in the hinge ends of the hinge bars, lever means for rocking the shaft and a releasable catch associated with said lever means.

7. In an electrical toaster, a toasting oven having a passage extending vertically therethrough open at the bottom, a support adapted to be positioned across said passage, heating means within the oven, means for measuring a definite flow of current to said heating means, and magnetically released means automatically removing said support from said passage following a predetermined power input through said heating means as determined by said measuring means, said support removing means comprising a lever-arm geared to the support, a latch-post cooperating with the lever-arm, a latch-bar cooperating with the post and magnetically withdrawn to unlatch the post.

8. In a toaster, a door normally swinging open by gravity, a slidingly guided bar, gear means connecting the bar with the door, a latch post, a post latch means, said bar normally being carried away from said latch means, the closing of said door carrying said post toward the latch means, whereby the post may be engaged by the latch means and the door thereby held against being opened, an electro-magnet associated with said latch means, an electric current measuring device, and means associated with said electro-magnet and said measuring device permitting the energizing of said magnet following a predetermined operation of said device to release said latch means.

9. In a toaster, an electrical heating element, a door adjacent said element normally swinging away therefrom, latch means retaining said door adjacent said element, electrical energy measuring means in circuit with said element, an electro-magnet adapted to release said latch means, and switch means operated by said measuring means to place said electro-magnet in an energizing circuit.

10. In a toaster, an electrical heating element, a door adjacent said element normally swinging away therefrom, latch means retaining said door adjacent said element, electrical energy measuring means in circuit with said element, an electro-magnet adapted to release said latch means, and switch means operated by said measuring means to place said electro-magnet in an energizing circuit, a switch in circuit with said element, measuring device, and electro-magnet, and switch opening means automatically operable following the energizing of said magnet.

11. In a toaster, an electrical heating element, a door adjacent said element normally swinging away therefrom, latch means retaining said door adjacent said element, electrical energy measuring means in circuit with said element, an electro-magnet adapted to release said latch means, and switch means operated by said measuring means to place said electro-magnet in an energizing circuit, and means for varying the time of operating said switch by said measuring means comprising a toggle switch in the circuit and a manually operated lever controlling the toggle switch.

12. In a toaster, a switch, an electrical heating element in circuit with the switch, a door adjacent said element normally swinging away from the element, latch means for retaining the door adjacent the element, means associated with said door and latch means opening and closing the switch as the door is moved respectively away from and toward the element, an electrical energy measuring means controlled by said switch, an electro-magnet adapted to release said latch means upon being energized, and a secondary switch in a circuit including said first switch and said electro-magnet adapted to be closed momentarily by said measuring means after said measuring means has been set in operation by closure of the primary switch.

13. In a toaster, an electrical heating element, a door adjacent said element normally swinging away therefrom, latch means comprising a lever-arm geared to the door, a latch post cooperating with the lever-arm and a latch-bar retaining said door adjacent said element, electrical energy measuring means in circuit with said element, an electro-magnet adapted to release said latch means, and switch means operated by said measuring means to place said electro-magnet in an energizing circuit, said measuring means having a revolvable member and said switch means having a drum turned by the member, a contact bar on the drum and a brush contacting the drum, said bar being of relatively narrow width to be carried past the brush by the inertia of the member.

In testimony whereof I affix my signature.

CHARLES W. MABEY.